H. E. MORTON.
MILLING ATTACHMENT FOR SHAPER RAMS.
APPLICATION FILED JULY 6, 1914.

1,167,647.

Patented Jan. 11, 1916.

Witnesses
Anna M. Dorr
Chas. W. Stauffiger

Inventor
Henry E. Morton,
By
Attorney

COLUMBIA PLANOGRAPH CO., WASHINGTON, D. C.

UNITED STATES PATENT OFFICE.

HENRY E. MORTON, OF MUSKEGON, MICHIGAN.

MILLING ATTACHMENT FOR SHAPER-RAMS.

1,167,647.  Specification of Letters Patent.  Patented Jan. 11, 1916.

Application filed July 6, 1914. Serial No. 849,236.

*To all whom it may concern:*

Be it known that I, HENRY E. MORTON, a citizen of the United States of America, residing at Muskegon, in the county of Muskegon and State of Michigan, have invented certain new and useful Improvements in Milling Attachments for Shaper-Rams, of which the following is a specification, reference being had therein to the accompanying drawings.

Certain operations in machining very large castings are accomplished with facility by the use of a traveling head shaper having a reciprocable tool carrying ram and in order that other operations, such as milling certain parts may be done at the same setting and thus facilitate the work, it is desirable to provide such machines with a suitable milling or boring attachment which may be quickly adjusted to any desired angle and is particularly adapted for the purpose.

The object of this invention is to provide such an attachment and combine the same with a holder for a shaping or planing tool in such a manner that either the rotary cutter or the fixed tool may be readily brought into operative position and adjusted to the work.

A further object is to provide certain other new and useful features in the construction and arrangement of parts, the invention consisting in the matters hereinafter set forth and more particularly pointed out in the appended claims, reference being had to the accompanying drawing in which—

Figure 2:
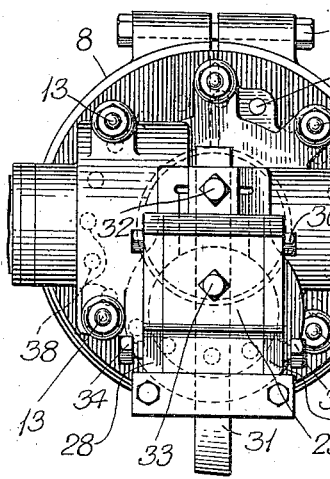
Figure 1:
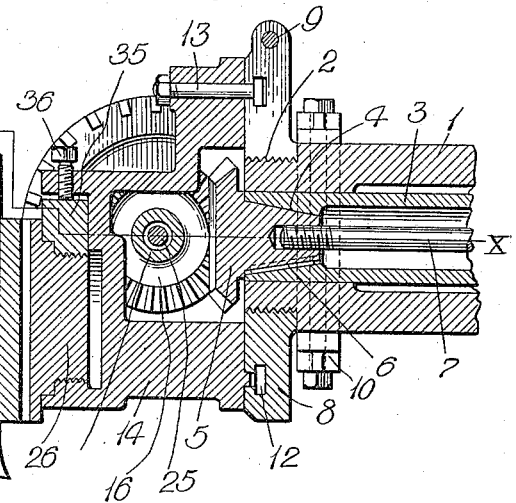
Figure 4:
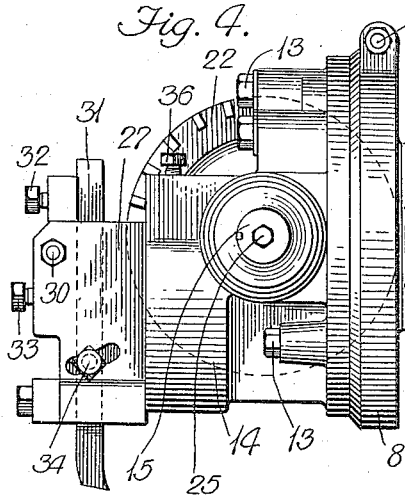
Figure 3:
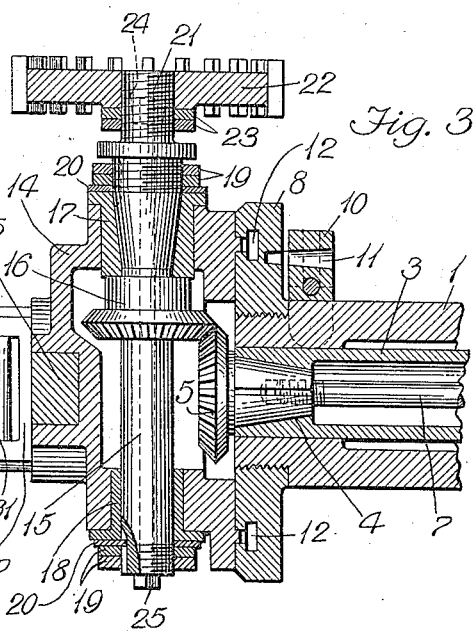

Figure 1 is a longitudinal vertical section through a device embodying the invention showing the same attached to a shaper ram; Fig. 2 an end elevation of the same; Fig. 3, a horizontal section on the line *x*—*x* of Fig. 1; and Fig. 4, a side elevation.

The attachment embodying the invention is shown as applied to the end of a shaper ram 1 of the usual rectangular shape in cross section and having a reduced and externally screwthreaded end 2. The ram is preferably formed hollow and extending through the hollow ram is a tubular arbor 3 formed with a tapering seat in its end for the tapered hub or shank 4 of a bevel pinion 5, the shank of said pinion being provided with a key 6 to engage a slot in the seat and secure the pinion and arbor to turn together, and the shank being held to its seat by a rod 7 extending through the tubular arbor and having a screwthreaded end to engage a socket in the end of the shank.

Upon the screwthreaded end 2 of the ram is a split ring 8 held from turning thereon by means of a clamping bolt 9 extending through openings in ears on the ring adjacent to the point where it is split, to contract said ring, and said ring may be further held against turning by detachably securing a clamping bar 10 to one side of the ram adjacent to the back of the ring and inserting a tapered pin through an opening 11 in the bar into a hole provided therefor in the ring. The ring is provided with a T-slot 12 in its front face to receive the heads of a series of bolts 13 from securing a head 14 to the ring. This head is formed with bearings for a transverse spindle 15 upon which is secured a bevel gear 16 in mesh with the gear 5, said head forming a casing for said bevel gear. Suitable bushings 17 and 18 are provided for the spindle and lock nuts 19 and washers 20 adjustably secure the spindle in place. An extended end 21 of the spindle is screwthreaded to receive a suitable cutter head 22, of any desired construction, the head being locked in place by lock nuts 23, and this end of the spindle is also preferably formed with a tapered socket 24 indicated in dotted lines in Fig. 3, to receive any other form of tool which may be held in place by a rod 25 extending through a bore in the spindle.

In the end of the head 14 opposite that which is faced off to seat against the ring 8, is a screwthreaded opening to receive an externally screwthreaded stud or projection 26 on a suitable tool holder 27 having side flanges 28 between which is a block 29 pivotally supported upon the flanges by a pivot pin 30 and having a suitable opening to receive a cutting tool or bar 31, clamping and adjusting screws 32, 33 and 34 being provided to engage the tool and hold it in place. The stud 26 of the tool holder is prevented from turning in its opening in the head 14 by a clamping block 35 slidable in a cut-away portion or slot in the head 14 into engagement with the stud 26, said block being moved by means of a screw 36.

The T-slot 12 in the ring 8 is concentric with the axis of the pinion 5 on the arbor 3 and thus by loosening the bolts 13, the head may be rotated upon the ring to swing the spindle 15 to any desired angle and when so swung it may be securely locked in the position to which it is turned by means of a tapered pin passed through an opening 37 (see Fig. 2) in the head into engagement with any one of a series of openings 38 indicated in dotted lines in the ring 8. The head may therefore be quickly adjusted to set the tool carried and driven by the spindle, at any desired position radially from and at right angles to the longitudinal axis of the arbor, and by combining a tool holder for the planing tool 31 with the head, said tool and any tool adapted to be driven by the spindle 15 may be interchangeably used without the necessity for dismounting the head from the ram. The rotatable mounting of the head also provides a rotatable adjustment of the planing tool so that it may also be set at any desired angle, and by placing the spindle and planing tools at different angles upon the head, one does not interfere with the use of the other.

Obviously, changes may be made in the construction and arrangement of parts without departing from the spirit of my invention and I do not therefore limit myself to the construction shown.

Having thus fully described my invention what I claim is:—

1. The combination with a shaper ram, of a head detachably secured to said ram to rotate in a plane transversely to the plane of the longitudinal axis of the ram and about said axis, a cutting tool carried by said head and adjusted by turning the head, and means coincident in the axis of the ram for driving said tool.

2. The combination with a shaper ram, of a head detachably secured to said ram and adapted to be turned in a plane transversely of the plane of the longitudinal axis of the ram and about said axis, tools carried by said head and extending in different radial directions to the longitudinal axis of the ram, means coincident with the axis of the ram for driving certain of the tools, and means for adjustably securing said head in the position to which it is turned to adjust the tools.

3. The combination with a shaper ram, of a ring detachably secured upon the end of the ram, a head engaging said ring and rotatively supported thereby opposite the end face of the ram to rotate upon an axis coincident with the longitudinal axis of the ram, a cutting tool on the head extending radially toward the axis of rotation of the head, means coincident with the axis of the ram for driving the tool, and a tool holder for a fixed tool detachably secured to the outer end of the head.

4. The combination with a shaper ram having a reduced and screwthreaded end portion, of a ring engaging said end portion, a head, means connecting the head and ring to permit a rotary movement of the head upon the ring, a spindle mounted in the head transversely of the longitudinal axis of the ram, and means coincident with the longitudinal axis of the ram and the axis of rotation of the head for driving said spindle.

5. The combination of a hollow ram, a head detachably secured to the ram over the open end of the ram, a driving member extending longitudinally of the ram within the same and coincident with the axis of rotation of the head, and a rotary cutting tool mounted on the head with its axis of rotation intersecting the axis of rotation of the driving member and operatively connected to the driving member to receive motion therefrom.

6. The combination of a hollow ram with its axis of rotation coincident with the longitudinal axis of the arbor, a driving arbor in the ram, a head rotatively mounted on the ram and having bearings, and a spindle in the bearings on the head extending transversely of the longitudinal axis of the arbor and operatively connected to the arbor to receive motion therefrom.

7. The combination of a hollow ram, an arbor mounted in the ram, a supporting ring concentric with the axis of said arbor, a head having means to engage the ring and rotatively support the same thereon, a spindle mounted in the head transversely of the arbor axis and operatively connected to the arbor to receive motion therefrom, and a tool holder on the outer end of the head for holding a tool to extend laterally of the head.

8. The combination of a hollow ram, an arbor mounted in the ram, a supporting ring concentric with the axis of said arbor, a head having means to engage the ring and rotatively support the same thereon opposite the end face of the ram, a spindle mounted in bearings on the head transversely of the axis of the arbor, gears on the spindle and arbor within the head for transmitting motion from the arbor to the spindle, and means for holding the head in the position to which it is turned upon the ring.

9. The combination of a hollow ram, an arbor in the ram, a bevel gear on the arbor beyond the end of the ram, a ring on the ram provided with a T-slot concentric with the axis of the arbor, a head, means on the head engaging said T-slot to hold the head in place on the ring, a spindle mounted in the head transversely of the axis of the arbor, a bevel gear on the spindle to engage the gear on the arbor, and a cutter on the projecting end of the spindle.

10. The combination of a hollow ram, an arbor in said ram, a gear secured to the end of the arbor beyond the end of the ram, a ring on the ram having a T-slot concentric with the axis of the arbor, means for detachably securing the ring against turning, a head having means for engaging the T-slot to rotatively secure the head to the ring, a spindle mounted in bearings in the head transversely of the longitudinal axis of the arbor, a tool detachably attached to the spindle, a tool holder having a projecting end portion for securing the same to the head, said head being formed with an opening in its outer end to receive said portion, means for detachably securing the tool holder in place, and a tool in the tool holder extending transversely of the head.

11. The combination of a ram, a head detachably and rotatably secured upon the end of the ram to turn upon an axis coincident with the longitudinal axis of the ram, a spindle mounted in the head with its axis of rotation extending transversely of the longitudinal axis of the ram, means in the head at the axis of the ram for driving the spindle, a tool holder on the head rotatably adjustable upon an axis extending parallel with and at one side of the longitudinal axis of the ram and axis of rotation of the head, and a tool in said tool holder extending laterally from the head.

In testimony whereof I affix my signature in presence of two witnesses.

HENRY E. MORTON.

Witnesses:
LEWIS E. FLANDERS,
ANNA M. DORR.

Copies of this patent may be obtained for five cents each, by addressing the "Commissioner of Patents, Washington, D. C."